United States Patent
Grandhi et al.

(10) Patent No.: US 9,148,902 B2
(45) Date of Patent: Sep. 29, 2015

(54) METHOD AND APPARATUS FOR PROVIDING PEER-TO-PEER COMMUNICATION WITH NETWORK CONNECTION

(75) Inventors: Sudheer A. Grandhi, Pleasanton, CA (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 12/885,144

(22) Filed: Sep. 17, 2010

(65) Prior Publication Data

US 2011/0069689 A1 Mar. 24, 2011

Related U.S. Application Data

(60) Provisional application No. 61/243,833, filed on Sep. 18, 2009.

(51) Int. Cl.
*H04W 4/00* (2009.01)
*H04W 76/04* (2009.01)
*H04W 76/02* (2009.01)
*H04W 92/18* (2009.01)

(52) U.S. Cl.
CPC .......... *H04W 76/043* (2013.01); *H04W 76/027* (2013.01); *H04W 92/18* (2013.01)

(58) Field of Classification Search
None
See application file for complete search history.

(56) References Cited

U.S. PATENT DOCUMENTS

| | | |
|---|---|---|
| 2005/0036469 A1 | 2/2005 | Wentink |
| 2007/0104138 A1 | 5/2007 | Rudolf et al. |
| 2008/0219228 A1* | 9/2008 | Seok et al. .................. 370/338 |
| 2009/0156224 A1 | 6/2009 | Matsumaru |
| 2009/0196211 A1* | 8/2009 | Wentink ...................... 370/311 |
| 2009/0196212 A1 | 8/2009 | Wentink |
| 2010/0046455 A1 | 2/2010 | Wentink et al. |
| 2010/0165896 A1* | 7/2010 | Gong et al. .................. 370/311 |

(Continued)

FOREIGN PATENT DOCUMENTS

| | | |
|---|---|---|
| JP | 2011-503999 | 1/2011 |
| JP | 2012-500606 | 1/2012 |

(Continued)

OTHER PUBLICATIONS

Draft Standard for Information Technology—Telecommunications and information exchange between systems—Local and metropolitan area networks—Specific requirements—Part 11: Wireless LAN Medium Access Control (MAC) and Physical Layer (PHY) specifications, Amendment 6: Extensions to Direct Link Setup, IEEE P802.11z/D6.0 (Aug. 2009).

Seok et al., "IEEE P802.11, Wireless LANs—Normative Text for Peer Power Save Mode," IEEE 802.11-08/0071r0, pp. 1-8 (Jan. 2008).

(Continued)

Primary Examiner — Otis L Thompson, Jr.
(74) Attorney, Agent, or Firm — Yasser Mourtada

(57) ABSTRACT

A method and apparatus may be used for peer-to-peer communication. The method and apparatus may allow for network connectivity during the peer-to-peer communication session. The network connectivity may be provided via Scheduled and/or Unscheduled AP Connection times/periods. A station (STA) may be configured to negotiate access point (AP) Connection times/periods with a peer STA for a direct link which may be on a basic service set (BSS) channel or on a non-BSS channel. The STAs may communicate with the AP during the agreed AP Connection times/periods and return to the direct link for peer-to-peer communication.

23 Claims, 9 Drawing Sheets

(56) References Cited

U.S. PATENT DOCUMENTS

| | | | |
|---|---|---|---|
| 2010/0177712 A1* | 7/2010 | Kneckt et al. | 370/329 |
| 2010/0271995 A1* | 10/2010 | Seok et al. | 370/311 |
| 2010/0304794 A1* | 12/2010 | Beninghaus et al. | 455/574 |
| 2011/0038291 A1* | 2/2011 | Seok | 370/311 |
| 2011/0188429 A1* | 8/2011 | Seok | 370/311 |
| 2012/0314663 A1* | 12/2012 | Dwivedi et al. | 370/329 |

FOREIGN PATENT DOCUMENTS

| | | |
|---|---|---|
| WO | WO-2007/032438 | 3/2007 |
| WO | 2008/010007 | 1/2008 |
| WO | WO-2009/064113 | 5/2009 |
| WO | WO-2007/055993 | 6/2009 |

OTHER PUBLICATIONS

"Canadian Office Action", Canadian Application No. 2774368, Nov. 26, 2013, 4 pages.
"Japanese Notice of Rejection", Japanese Application No. 2012-529923, Jul. 2, 2013, 3 pages.
"Japanese Notice of Rejection (English Translation)", Japanese Application No. 2012-529923, Jul. 2, 2013, 3 pages.
"Singapore Search and Final Examination Report", Singapore Application No. 201201746-3, Jun. 28, 2013, 62 pages.
Seok, Yongho, "Normative Text for Peer Power Save Mode", IEEE P802.11, Jan. 14, 2008, 8 pages.
"Canadian Office Action", Canadian Application No. 2,774,368, Dec. 29, 2014, 3 pages.

* cited by examiner

METHOD AND APPARATUS FOR PROVIDING PEER-TO-PEER COMMUNICATION WITH NETWORK CONNECTION

CROSS REFERENCE TO RELATED APPLICATIONS

This application claims the benefit of U.S. Provisional Application No. 61/243,833 filed on Sep. 18, 2009, the contents of which are hereby incorporated by reference.

BACKGROUND

A wireless local area network (WLAN) in infrastructure basic service set (BSS) mode may have an access point (AP) for the BSS and one or more stations (STAs) associated with the AP. The AP may access or interface with a distribution system (DS) or another type of wired or wireless network that carries traffic in and out of the BSS. Traffic to STAs that originate from outside the BSS may be delivered through the AP. Traffic originating from STAs to destinations outside the BSS may be sent by the AP to the respective destinations. Traffic between STAs within the BSS may be sent through the AP where the source STA may send traffic to the AP and the AP delivers the traffic to the destination STA. Such traffic between STAs within the BSS may be referred to as peer-to-peer traffic.

Peer-to-peer traffic routed through the AP may be inefficient. For example, the traffic may be sent from the source STA to the AP and then from the AP to the destination STA, thereby sending the same information twice. Each transmission may entail medium access overhead, which may therefore also be incurred twice. It would therefore be desirable to have a method and apparatus for setting up and operating an efficient peer-to-peer communication.

SUMMARY

A method and apparatus may be used for peer-to-peer communication. The method and apparatus may allow for network connectivity during the peer-to-peer communication session. The apparatus may be a STA configured to transmit a first peer-to-peer communication frame and receive a second peer-to-peer communication frame in response. The STA may be configured to communicate with an AP during a peer-to-peer communication session with another STA. Communication with the AP may occur when the STA is not engaged in a direct communication with the other STA.

BRIEF DESCRIPTION OF THE DRAWINGS

A more detailed understanding may be had from the following description, given by way of example in conjunction with the accompanying drawings wherein.

DETAILED DESCRIPTION

Figure 1A:
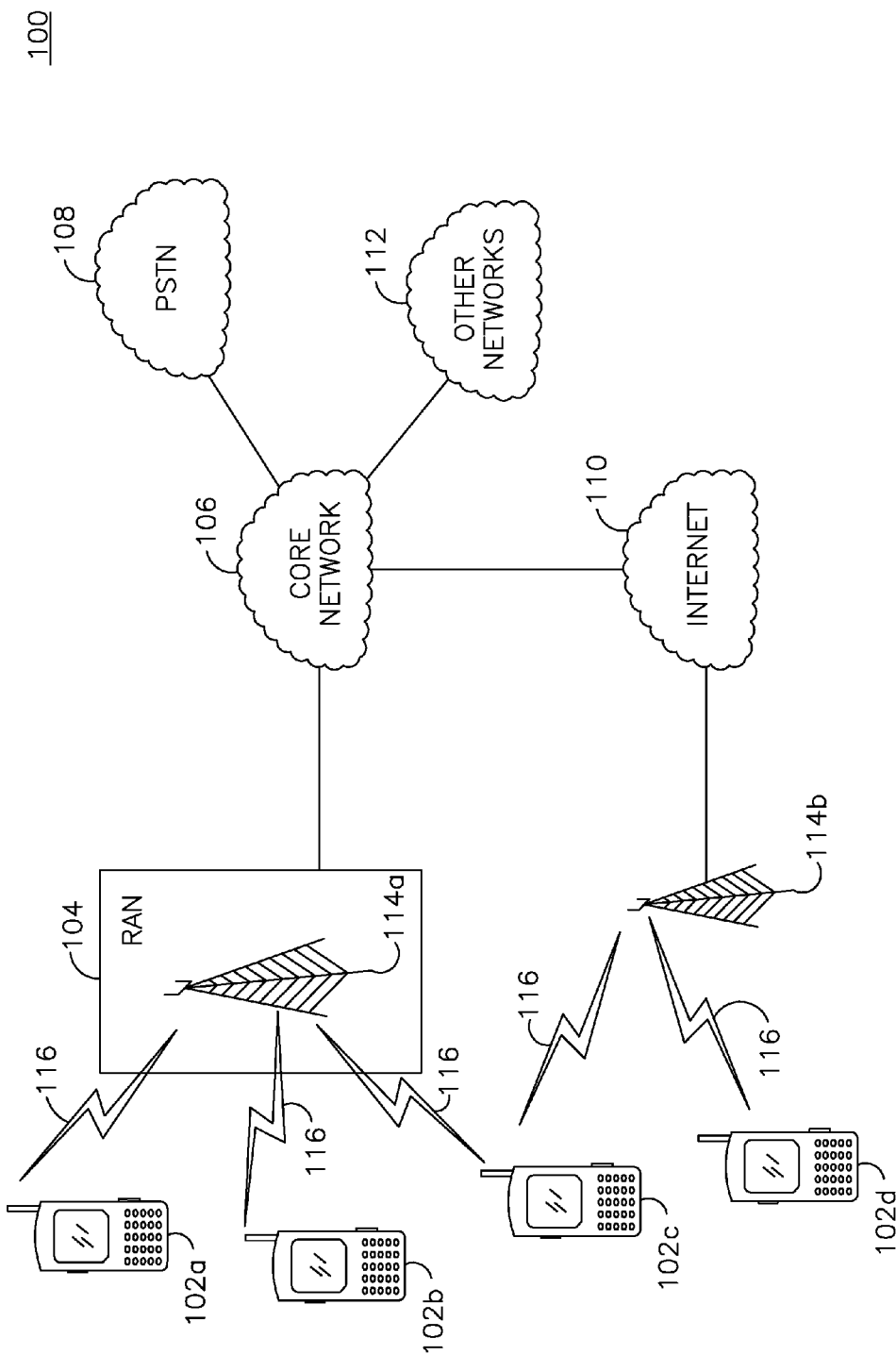
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
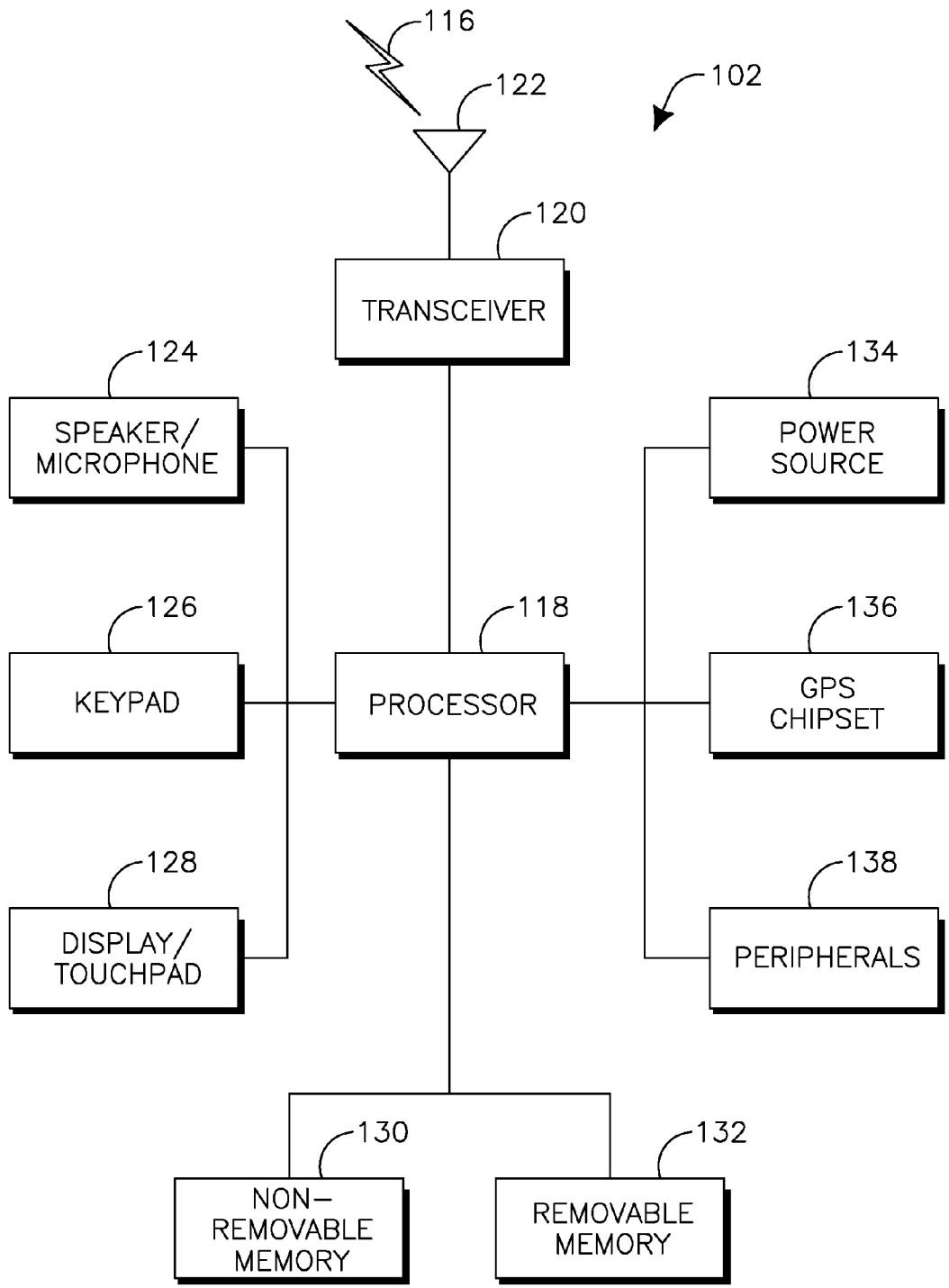
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
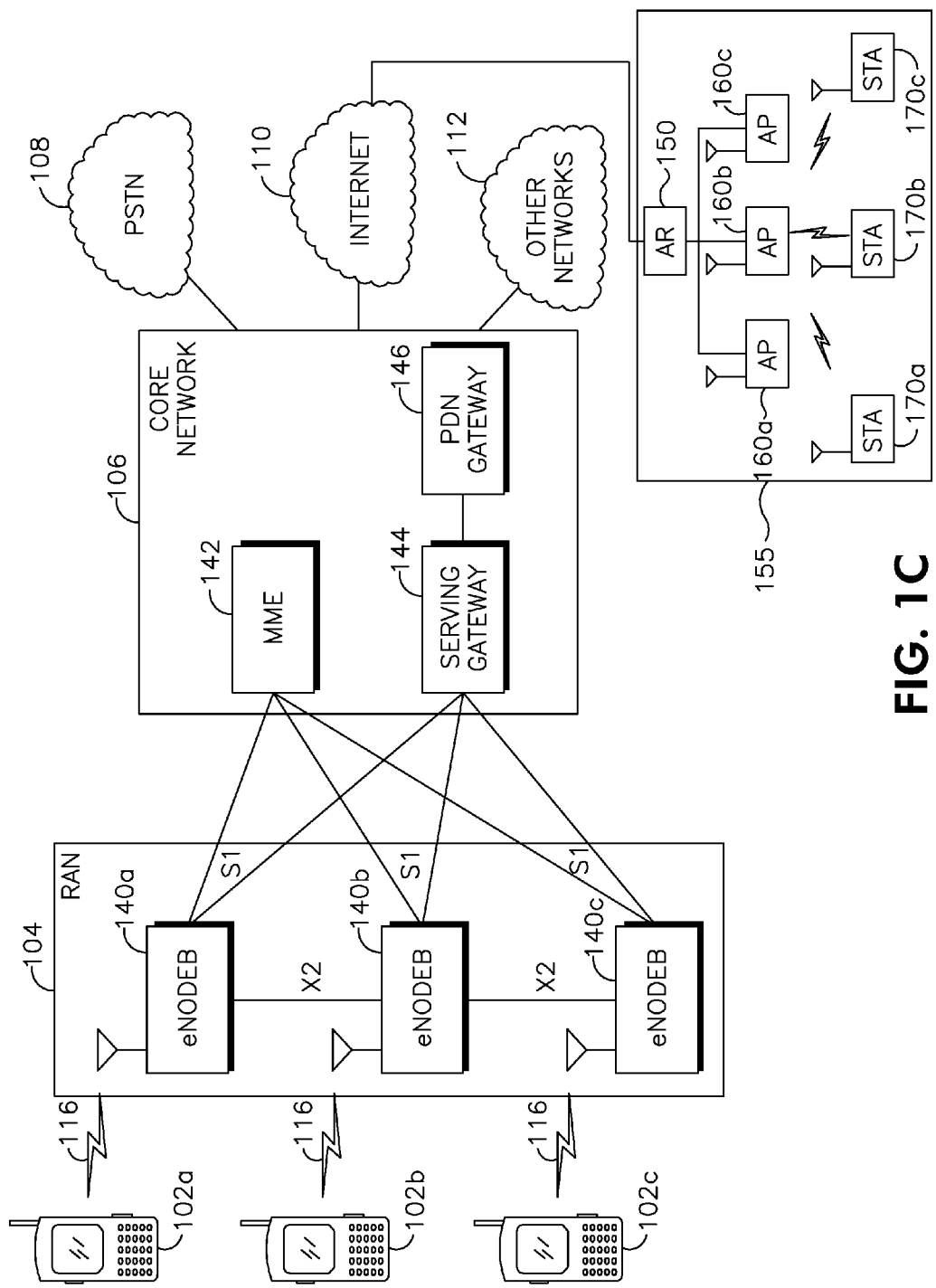
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "STA" includes but is not limited to a wireless transmit/receive unit (WTRU), a user equipment (UE), a mobile station, a fixed or mobile subscriber unit, a pager, a cellular telephone, a personal digital assistant (PDA), a computer, a mobile internet device (MID) or any other type of user device capable of operating in a wireless environment. When referred to herein, the terminology "AP" includes but is not limited to a base station, a Node-B, a site controller, or any other type of interfacing device capable of operating in a wireless environment.

The terminology "Scheduled AP Connection" herein refers to an AP Connection that may be defined by a schedule or pattern of AP connection instances each with a duration and may be updated between two peer STAs to change the agreed schedule or pattern. An example of a Scheduled AP Connection may be a STA connecting to an AP over time intervals periodically with a specified start or reference time. The terminology "Unscheduled AP Connection" herein refers to an AP Connection that may be defined by a number of AP connection instances, each with a duration and may not be updated once agreed between two peer STAs. An example of an Unscheduled AP Connection is a STA connecting to an AP over two unequal time intervals with specified start or reference times. Another example of an Unscheduled AP Connection may be a STA connecting to an AP over a single time interval with a specified start or reference time.

The channel on which the AP in the BSS operates to communicate with its associated STAs may be referred to herein as the "base-channel." If the direct link is on a channel that is not the base-channel, then this channel may be referred to herein as the "off-channel."

The method and apparatus may provide an enhanced tunneled direct link setup (TDLS) mechanism for Very High Throughput (VHT) WLANs that may achieve data transmissions greater than 100 Mbps. For VHT applications in WLAN, it would be desirable for the direct link communication support Scheduled and/or Unscheduled connection times/periods with the AP, to obtain information relevant to a peer-to-peer application. This may be relevant in the case of a direct link setup on an off-channel or non-BSS channel. An example application of this may be using internet connectivity to obtain content and other information, such as internet gaming, promotions, recommendations, online video information, etc., relevant to the video communication between peer STAs, for example in a Video Player Unit and Video Display Unit in an Institute of Electrical and Electronics Engineers (IEEE) 802.11ac/ad network.

A peer-to-peer communication frame, for example a TDLS Action frame, may be used to support Scheduled and/or Unscheduled AP connections. The peer-to-peer communication frames may be of the management frame subtype "Action" and may trigger an acknowledgement (ACK) frame from the recipient STA upon successful reception. In another variation, the peer-to-peer communication frames used to support Scheduled and/or Unscheduled AP connections may be of the management frame subtype "Action No ACK" and may not trigger an ACK from the recipient STA upon successful reception. Furthermore, these peer-to-peer communication frames of the management frame subtype "Action No ACK" may be aggregated by a STA with one or more of data frames, control frames, and management frames for transmission in an aggregated packet data unit.

Figure 2:
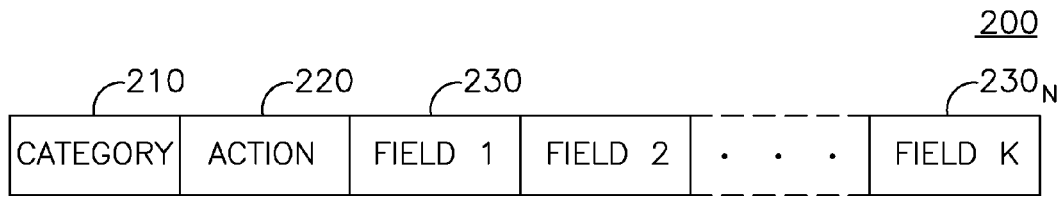
FIG. 2 is a diagram of an example peer-to-peer communication frame.

FIG. 2 is a diagram of an example peer-to-peer communication frame. Referring to FIG. 2, the peer-to-peer communication frame 200 may contain a Category field 210, and an Action field 220. The Action field 220 may include a value that identifies the type of the peer-to-peer communication frame, for example, a TDLS Setup Request, a TDLS Setup Response, or a TDLS Teardown. Additional examples of Action field 220 values and corresponding peer-to-peer communication frames are listed in Table 1 below. The peer-to-peer communication frame 200 may include other fields 230-230n specified based on a peer-to-peer communication frame type where one or more of the fields may be an Information Element (IE).

TABLE 1

802.11 z Peer-to-peer communication frames and corresponding action field values

| Action field value | Peer-to-peer communication frames |
| --- | --- |
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS AP PHY Data Rate Request |
| 10 | TDLS AP PHY Data Rate Response |
| 11-255 | Reserved |

A TDLS mechanism may be enhanced to support Scheduled and/or Unscheduled connection periods with the AP, for example, by modifying a peer-to-peer communication frame, or by modifying a peer-to-peer communication frame and adding new peer-to-peer communication frames. The Action field values assigned to the new peer-to-peer communication frames may be chosen in a flexible and convenient manner from the currently reserved numbers from 11 to 255 in IEEE 802.11z as shown in Table 1 above. A STA may encapsulate the modified or new peer-to-peer communication frame in a Data frame or any other frame, to tunnel through the AP, and transmit the encapsulated frame to a STA directly or through the AP.

The following is an example of a first embodiment for the transmission of Capability information by STAs in TDLS Request and TDLS Response frames that may indicate whether or not there is support in the STA for Scheduled and Unscheduled AP connection times/periods. This may be achieved by modifying peer-to-peer communication frames as shown in the list in Table 2 below.

TABLE 2

Modified peer-to-peer communication frames for VHT

| Action field value | Peer-to-peer communication frames |
|---|---|
| 0 | TDLS Setup Request (MODIFIED) |
| 1 | TDLS Setup Response (MODIFIED) |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS AP PHY Data Rate Request |
| 10 | TDLS AP PHY Data Rate Response |
| 11-255 | Reserved |

Figure 3:
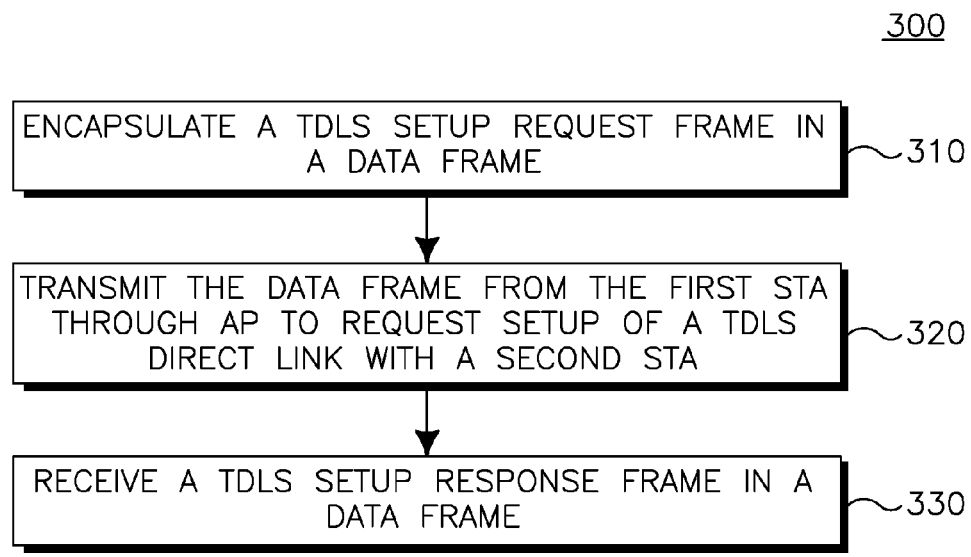
FIG. 3 is a flow diagram of an example TDLS Setup method.

FIG. 3 is a flow diagram of an example TDLS Setup method 300. A STA initiating TDLS may encapsulate the TDLS Setup Request frame in a Data frame 310. The initiating STA may transmit the Data frame to the recipient STA through the AP to request the setup of a TDLS direct link 320. The TDLS Setup Request frame may include an IEEE 802.11 Extended Capabilities information element as one of its fields. A subfield comprising one or more bits may be used in the Extended Capabilities information element to indicate whether or not there is support in the initiating STA for Scheduled and Unscheduled AP connection times/periods.

In one variation, a dedicated subfield comprising one or more bits may be used for indication of support for Scheduled AP connection times/periods. This subfield may be different from a dedicated subfield comprising one or more bits used to indicate support for Unscheduled AP connection times/periods. Thus, the TDLS Setup Request frame may be modified in this way such that a STA initiating TDLS may indicate support for Scheduled and Unscheduled AP connection times/periods. Therefore, a STA may indicate support for Scheduled and Unscheduled AP connection by appropriately setting the corresponding subfield or subfields in the Extended Capabilities information element included in the TDLS Setup Request frame.

In response to transmitting the modified TDLS Setup Request frame, the initiating STA may receive an encapsulated TDLS Setup Response frame in a Data frame 330. The Data frame may be received through the AP. A STA responding to the modified TDLS Setup Request frame may indicate support for Scheduled and Unscheduled AP connection times/periods by including an IEEE 802.11 Extended Capabilities information element in the TDLS Setup Response frame. As described in the case of the modified TDLS Setup Request frame, a subfield comprising one or more bits may be used in the Extended Capabilities information element to indicate whether or not there may be support in the STA for Scheduled and Unscheduled AP connection times/periods.

In one variation, a dedicated subfield comprising one or more bits may be used for indication of support for Scheduled AP connection times/periods. This subfield may be different from a dedicated subfield comprising one or more bits used to indicate support for Unscheduled AP connection times/periods. Thus, the TDLS Setup Response frame may be modified in this way so that a STA responding to the modified TDLS Setup Request frame may indicate support for Scheduled and Unscheduled AP connection times/periods. Therefore, a STA may indicate support for Scheduled and Unscheduled AP connection by setting appropriately the corresponding subfield or subfields in the Extended Capabilities information element included in the TDLS Setup Response frame.

The STAs may be enabled to transmit Capability information in TDLS Request and TDLS Response frames that indicate whether or not there is support in the STA for Scheduled and/or Unscheduled AP connection times/periods. The transmission of this capability information by the STAs may be achieved by using: (1) any of the existing TDLS Request and TDLS Response frames in IEEE 802.11z as in Table 1 with appropriate modifications, or (2) new TDLS Request and TDLS Response frames. A subfield comprising one or more bits may be used to indicate whether or not there is support or capability in the STA for Scheduled and/or Unscheduled AP connection times/periods. In one variation, a dedicated new subfield comprising one or more bits may be used for indication of support or capability for Scheduled AP connection times/periods which is different from a dedicated new subfield comprising one or more bits used to indicate support or capability for Unscheduled AP connection times/periods.

The STAs may be enabled to transmit Scheduled/Unscheduled AP Connection times/periods information in TDLS Request and in TDLS Response frames. Status information may be used in TDLS Response frames to indicate success or failure of the TDLS Scheduled/Unscheduled AP Connection Request operation, and if the operation results in failure, the cause of failure. For the TDLS Scheduled/Unscheduled AP Connection Request operation the following success and failure indications may be used in Status information: AP Connection Times/Periods information accepted, AP Connection Times/Periods information rejected, and AP Connection Times/Periods information rejected but alternative AP Connection Times/Periods information proposed.

Figure 4:
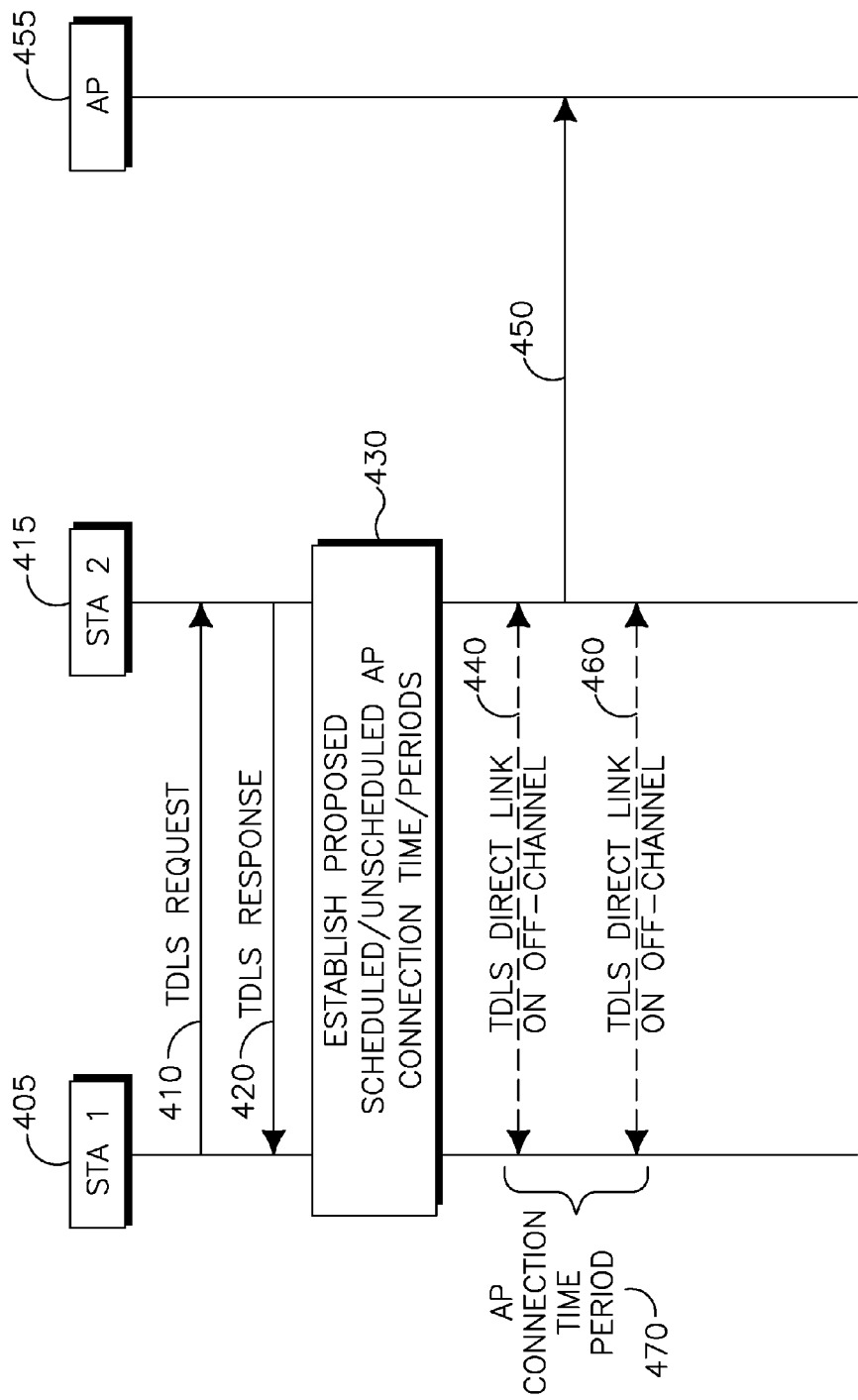
FIG. 4 is a diagram of an example method for setting up an AP connection during a peer-to-peer communication.

FIG. 4 is a diagram of an example method for setting up an AP connection during a peer-to-peer communication. A STA1 405 may send a TDLS Request frame 410 including proposed Scheduled/Unscheduled AP Connection Times/Periods to a STA2 415 that indicates support for Scheduled/Unscheduled AP Connection. The STA2 415 may transmit Scheduled/Unscheduled AP Connection times/periods information in a TDLS Response frame 420 if the associated Status information in the TDLS Response frame indicates "AP Connection Times/Periods information rejected but alternative AP Connection Times/Periods information proposed". A Dialog Token field may be used in the TDLS Request and Response frames for matching TDLS Response frames with TDLS Request frames. The alternative AP Connection Times/Periods information may be used by the initiator STA to revise its AP Connection Times/Periods information and send it in a subsequent TDLS Request frame to the STA2 415.

After successfully receiving a TDLS Response frame from the STA2 415 with the Status code indicating acceptance, the proposed Scheduled/Unscheduled AP Connection Times/Periods is established 430 between the peer STAs 405, 415. The peer STAs may maintain Scheduled/Unscheduled AP connectivity according to the agreed AP Connection Times/Periods. If the TDLS direct link is on an off-channel 440 then the peer STAs 405, 415 may switch to the base channel 450 in order to communicate with the AP 455 and then return to the off-channel 460, all within each AP connection time period 470 allowed by the agreed Scheduled/Unscheduled AP Connection Times/Periods between the peer STAs. The transmission of the Scheduled/Unscheduled AP Connection times/periods information by STAs may be achieved by using: (1) any of the TDLS Request and TDLS Response frames, as shown in Table 1, with appropriate modifications or (2) modified TDLS Request and TDLS Response frames.

To transmit Scheduled AP Connection times/periods information an Information Element may be defined that may be referred to as an AP Connection Schedule Information Element. For example, this information element may contain fields including an Element ID, a Length, and Schedule Information, for example Start Times, End Times, Durations, Periodicity, and Reference Timing describing which time intervals may be used for AP connection. The AP Connection Schedule, once established between peer STAs 405, 415, may be valid until either of the peer STAs 405, 415 explicitly updates the current AP Connection Schedule with a TDLS Request/Response exchange procedure or the TDLS direct link is torn down.

To transmit Unscheduled Connection times/periods information, an Information Element may be defined that may be referred to as an AP Connection Times/Periods Information Element. For example, this information element may contain fields including an Element ID, a Length, and Connection Times/Periods Information, for example Start Times, End Times, Durations, Reference Timing describing which time intervals may be used for AP connection, in that order or any other order. Note that the AP Connection Times/Periods field or Information Element may specify just one single AP connection time interval. The Unscheduled AP Connection Times/Periods agreement, once established between peer STAs 405, 415, may be valid until the agreed AP Connection Times/Periods expire or the TDLS direct link is torn down, whichever occurs first. The Unscheduled AP Connection Times/Periods agreement, once established may not be updated by either of the peer STAs 405, 415.

When a STA needs to communicate with the AP 455, the STA1 405 may setup an AP Connection time/period by transmitting Scheduled/Unscheduled AP connection times/periods information using a TDLS Request frame 410 and TDLS Response frame 420. For example, a TDLS Scheduled AP Connection Request frame and a TDLS Scheduled AP Connection Response frame may be employed as shown in Table 3 below. The TDLS Scheduled AP Connection Request frame and the TDLS Scheduled AP Connection Response frame may support Scheduled AP Connection times/periods while on the TDLS direct link.

TABLE 3

| Modifications and additions to Peer-to-peer communication frames for VHT | |
|---|---|
| Action field value | Peer-to-peer communication frames |
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS AP PHY Data Rate Request |
| 10 | TDLS AP PHY Data Rate Response |
| (Flexible) | TDLS Scheduled AP Connection Request |
| (Flexible) | TDLS Scheduled AP Connection Response |

TABLE 3-continued

| Modifications and additions to Peer-to-peer communication frames for VHT | |
|---|---|
| Action field value | Peer-to-peer communication frames |
| (Flexible) | TDLS Unscheduled AP Connection Request |
| (Flexible) | TDLS Unscheduled AP Connection Response |
| Remaining up to 255 | Reserved |

A STA may send a TDLS Scheduled AP Connection Request frame including a proposed AP Connection Schedule to a peer STA that indicates support for Scheduled AP Connection. The peer STA may respond with a TDLS Scheduled AP Connection Response frame, with the Status Code set in one of the following three ways: (1) accept the proposed AP Connection Schedule (2) reject the proposed AP Connection Schedule, or (3) reject the proposed AP Connection Schedule and propose an alternative schedule.

Figure 5:
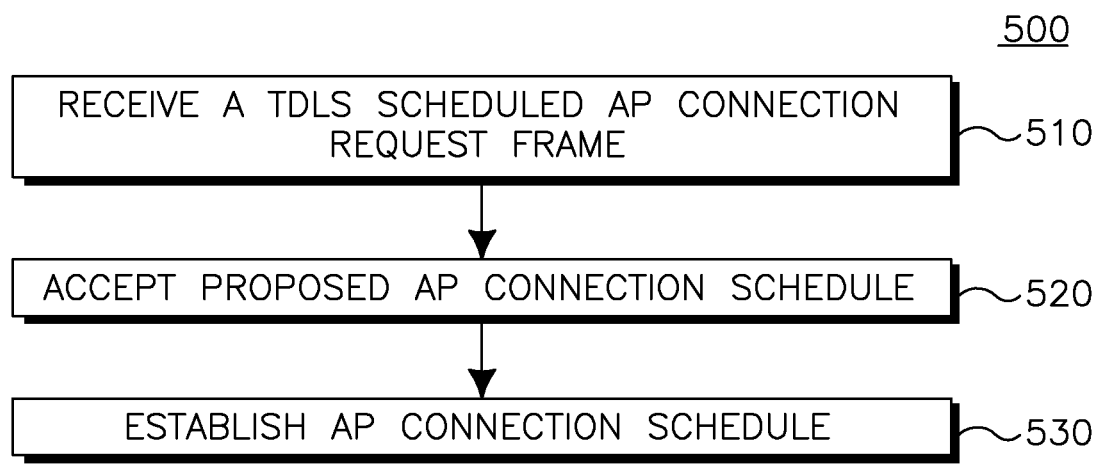
FIG. 5 is a flow diagram of an example method where a STA responds with a TDLS Scheduled AP Connection Response frame.

FIG. 5 is a diagram of an example method 500 where a STA responds to a TDLS Scheduled AP Connection Request frame with a TDLS Scheduled AP Connection Response frame with the status code set to accept the proposed AP Connection Schedule. The STA may receive a TDLS Scheduled AP Connection Request frame 510, and accept the proposed AP Connection Schedule 520. The STA may then establish an AP Connection Schedule 530.

Figure 6:
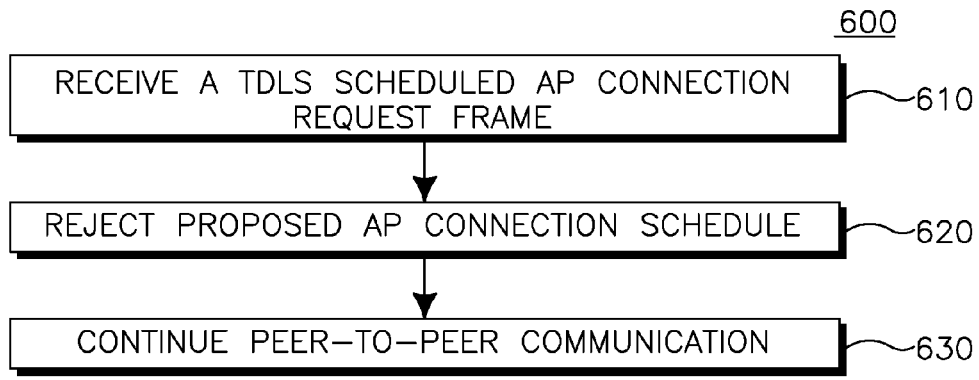
FIG. 6 is a flow diagram of another example method where a STA responds with a TDLS Scheduled AP Connection Response frame.

FIG. 6 is a diagram of an example method 600 where a STA responds to a TDLS Scheduled AP Connection Request frame with a TDLS Scheduled AP Connection Response frame with the status code set to reject the proposed AP Connection Schedule. The STA may receive a TDLS Scheduled AP Connection Request frame 610, and reject the proposed AP Connection Schedule 620. Upon rejection of the proposed AP Connection Schedule, the STAs may continue an ongoing peer-to-peer communication 630.

Figure 7:
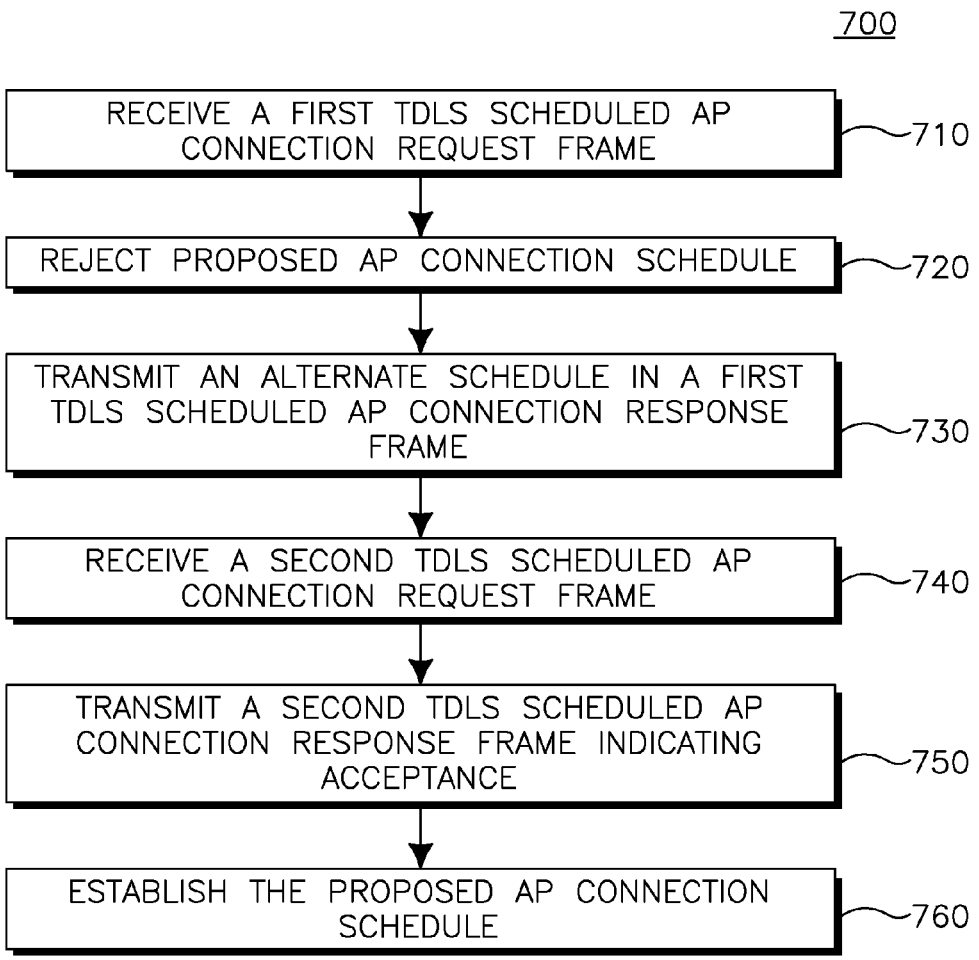
FIG. 7 is a flow diagram of another example method where a STA responds with a TDLS Scheduled AP Connection Response frame.

FIG. 7 is a diagram of an example method 700 where a STA responds to a TDLS Scheduled AP Connection Request frame with a TDLS Scheduled AP Connection Response frame with the status code set to reject the proposed AP Connection Schedule and propose an alternative schedule. A STA may receive a first TDLS Scheduled AP Connection Request frame 710 and reject the proposed AP Connection Schedule 720 indicated in the received TDLS Scheduled AP Connection Request frame. The STA may transmit an alternate schedule in a first TDLS Scheduled AP Connection Response frame 730. In response, the STA may receive a second TDLS Scheduled AP Connection Request frame 740. The STA may then transmit a second TDLS Scheduled AP Connection Response frame indicating acceptance 750 and establish the proposed AP Connection Schedule 760.

The AP Connection Schedule, once established, may be valid until either of the STAs explicitly update the current AP Connection Schedule with a TDLS Scheduled AP Connection Request/Response exchange procedure or the TDLS direct link is torn down. The STAs may maintain AP connectivity according to the negotiated AP Connection schedule. If the TDLS direct link is on an off-channel, then the STAs may switch to the base channel in order to communicate with the AP and then return to the off-channel, all within each AP connection time period allowed by the established AP Connection Schedule between the STAs.

A STA may encapsulate the TDLS Scheduled AP Connection Request frame in a Data frame and transmit it to the peer STA directly or through the AP to setup or change Scheduled AP Connection times/periods while on the TDLS direct link. The frame body of the TDLS Scheduled AP Connection Request frame 800 may contain the information shown in FIG. 8.

Figure 8:
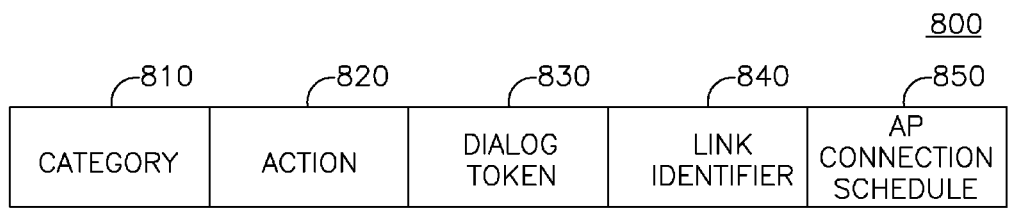
FIG. 8 is a diagram of an example frame body of a TDLS Scheduled AP Connection Request frame.

For example, the frame body of the TDLS Scheduled AP Connection Request frame 800 may include a Category field 810, an Action field 820, a Dialog Token field 830, a Link Identifier field 840, and an AP Connection Schedule 850. Referring to FIG. 8, the Category field 810 may be set to a value representing TDLS. The Action field 820 may be set to a value representing a TDLS Scheduled AP Connection Request.

The Dialog Token field 830 may be set to a value chosen by the STA and may be used for matching Action Response frames with Action Request frames. This value may be determined such that it is unique among TDLS Scheduled AP Connection Request frames for which a corresponding TDLS Scheduled AP Connection Response frame is not yet received.

The Link Identifier field 840 may contain a Link Identifier information element, for example, as defined in IEEE 802.11z. This information element may contain information that identifies the TDLS direct link. The Link Identifier information element may contain fields including an Element ID, a Length, a BSSID, a TDLS initiator STA Address, and a TDLS responder STA Address.

The AP Connection Schedule field 850 may specify a Schedule for AP Connection. This may be achieved by setting this field to an Information Element that contains the AP Connection Schedule and other relevant information. An Information Element may be defined for this purpose called an AP Connection Schedule Information Element. For example, this information element may contain fields including an Element ID, a Length, and Schedule Information such as, for example, Start Times, End Times, Durations, Periodicity, and Reference Timing describing which time intervals may be used for AP connection.

A STA may encapsulate the TDLS Scheduled AP Connection Response frame in a Data frame and transmit it to the peer STA directly or through the AP in response to a TDLS Scheduled AP Connection Request frame. The frame body of the TDLS Scheduled AP Connection Response frame 900 may contain the information shown in FIG. 9.

Figure 9:
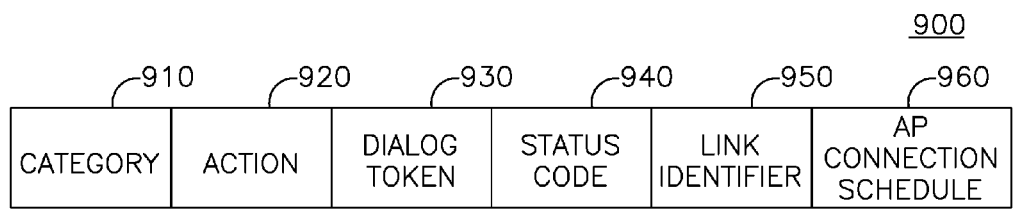
FIG. 9 is a diagram of an example frame body of a TDLS Scheduled AP Connection Response frame.

For example, the frame body of the TDLS Scheduled AP Connection Response frame 900 may include a Category field 910, an Action field 920, a Dialog Token field 930, a Status Code field 940, a Link Identifier field 950, and an AP Connection Schedule field 960. Referring to FIG. 9, the Category field 910 may be set to a value representing TDLS. The Action field 920 may be set to a value representing TDLS Scheduled AP Connection Response.

The Dialog Token field 930 may be set to the value contained in a corresponding received TDLS Scheduled AP Connection Request frame. This field may be used for matching Action Response frames with Action Request frames.

The Status Code field 940 may be set to indicate success or failure of the TDLS Scheduled AP Connection Request operation, and if the operation results in failure, the cause of failure. For the TDLS Scheduled AP Connection Request operation, the following success and failure indications may be used: AP Connection Schedule accepted, AP Connection Schedule rejected, and AP Connection Schedule rejected but alternative schedule proposed. Additional Status Codes may be added to the existing Status Codes in IEEE 802.11 to represent these success and failure indications for the TDLS Scheduled AP Connection Request operation.

The Link Identifier field 950 may contain a Link Identifier information element, for example, as defined in IEEE 802.11z. This information element may contain information that identifies the TDLS direct link. The Link Identifier information element may contain fields including an Element ID, a Length, a BSSID, a TDLS initiator STA Address, and a TDLS responder STA Address.

The AP Connection Schedule field 960 may specify a Schedule for AP Connection and may be present only if the Status Code field corresponds to "AP Connection Schedule rejected but alternative schedule proposed". The AP Connection Schedule may be specified by setting this field to an information element that contains the AP Connection Schedule and other relevant information. An information element may be defined for this purpose called an AP Connection Schedule information element. The information element defined for the TDLS Scheduled AP Connection Request frame may be used here. For example, this information element may contain fields including an Element ID, a Length, and Schedule Information, such as Start Times, End Times, Durations, Periodicity, and Reference Timing describing which time intervals may be used for AP connection.

As an alternative to employing TDLS Scheduled AP Connection Request and Response frames, the STA may employ a TDLS Unscheduled AP Connection Request frame and a TDLS Unscheduled AP Connection Response frame as shown in Table 3 to support Unscheduled AP Connection times/periods while on the TDLS direct link.

Similar to the TDLS Scheduled AP Connection Request frame, a STA may encapsulate the TDLS Unscheduled AP Connection Request frame in a Data frame and transmit it to the peer STA directly or through the AP, to setup or change Unscheduled AP Connection times/periods while on the TDLS direct link. The frame body of the TDLS Unscheduled AP Connection Request frame 1000 may contain the information shown in FIG. 10.

Figure 10:
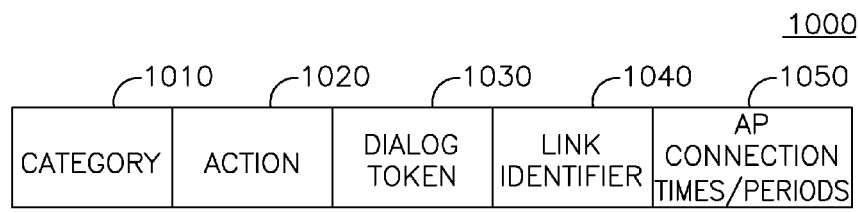
FIG. 10 is a diagram of an example frame body of a TDLS Unscheduled AP Connection Request frame.

For example, the frame body of the TDLS Unscheduled AP Connection Request frame 1000 may include a Category field 1010, an Action field 1020, a Dialog Token field 1030, a Link Identifier field 1040, and an AP Connection Times/Periods field 1050. Referring to FIG. 10, the Category field 1010 may be set to a value representing TDLS. The Action field 1020 may be set to a value representing TDLS Unscheduled AP Connection Request.

The Dialog Token field 1030 may be set to a value chosen by the STA and used for matching Action Response frames with Action Request frames. This value may be determined such that it is unique among TDLS Unscheduled AP Connection Request frames for which a corresponding TDLS Unscheduled AP Connection Response frame is not yet received.

The Link Identifier field 1040 may contain a Link Identifier information element, for example, as defined in IEEE 802.11z. This information element may contain information that identifies the TDLS direct link. The Link Identifier information element may contain fields including an Element ID, a Length, a BSSID, a TDLS initiator STA Address, and a TDLS responder STA Address.

The AP Connection Times/Periods field 1050 may specify times/periods for the AP Connection. This may be achieved by setting this field to an Information Element that contains the AP Connection Times/Periods and other relevant information. An Information Element may be defined for this purpose called an AP Connection Times/Periods Information Element. For example, this information element may contain fields including an Element ID, a Length, and Connection Times/Periods Information, for example Start Times, End Times, Durations, and Reference Timing describing which time intervals may be used for AP connection. Note that the AP Connection Times/Periods field or Information Element may specify just one single AP connection time interval or period as well.

A STA may encapsulate the TDLS Unscheduled AP Connection Response frame in a Data frame and transmits it to the peer STA directly or through the AP, in response to a TDLS Unscheduled AP Connection Request frame. The frame body of the TDLS Unscheduled AP Connection Response frame 1100 may contain the information shown in FIG. 11.

Figure 11:
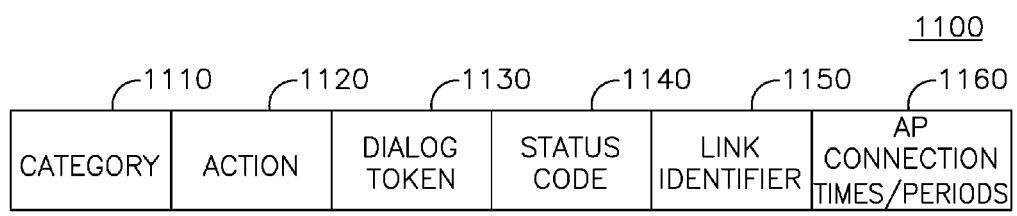
FIG. 11 is a diagram of an example frame body of a TDLS Unscheduled AP Connection Response frame.

For example, the frame body of the TDLS Unscheduled AP Connection Response frame 1100 may include a Category field 1110, an Action field 1120, a Dialog Token field 1130, a Status Code field 1140, a Link Identifier field 1150, and an AP Connection Times/Periods field 1160. Referring to FIG. 11, the Category field 1110 may be set to a value representing TDLS. The Action field 1120 may be set to a value representing TDLS Unscheduled AP Connection Response.

The Dialog Token field 1130 may be set to the value contained in the corresponding received TDLS Unscheduled AP Connection Request frame. This field may be used for matching Action Response frames with Action Request frames.

The Status Code field 1140 may be set to indicate success or failure of the TDLS Unscheduled AP Connection Request operation and, if the operation results in failure, the cause of the failure. For the TDLS Unscheduled AP Connection Request operation, the following success and failure indications may be used: AP Connection Times/Periods accepted, AP Connection Times/Periods rejected, and AP Connection Times/Periods rejected but alternative Times/Periods proposed. Additional Status Codes may be added to the Status Codes in 802.11 to represent these success and failure indications for the TDLS Unscheduled AP Connection Request operation.

The Link Identifier field 1150 may contain a Link Identifier information element, for example, as defined in IEEE 802.11z. This information element may contain information that identifies the TDLS direct link. The Link Identifier information element may contain fields including an Element ID, a Length, a BSSID, a TDLS initiator STA Address, and a TDLS responder STA Address.

The AP Connection Times/Periods field 1160 may specify times/periods for AP Connection and may be present if the Status Code field corresponds to "AP Connection Times/Periods rejected but alternative Times/Periods proposed." The AP Connection Times/Periods may be specified by setting this field to an information element that contains the AP Connection Times/Periods and other relevant information. An information element may be defined for this purpose called an AP Connection Times/Periods information element. The information element defined for the TDLS Unscheduled AP Connection Request frame may be used here. For example, this information element may contain fields including an Element ID, a Length, and Connection Times/Periods Information, for example Start Times, End Times, Durations, and Reference Timing describing which time intervals may be used for AP connection. Note that the AP Connection Times/Periods field or Information Element may specify just one single AP connection time interval or period as well.

Similar to the example where a STA sends a TDLS Scheduled AP Connection Request frame, the STA may send a TDLS Unscheduled AP Connection Request frame including an AP Connection Times/Periods element to a peer STA that may indicate support for Unscheduled AP Connection. The peer STA may respond with a TDLS Unscheduled AP Connection Response frame, with the Status Code set appropriately, in one of the following three ways: (1) accept the proposed AP Connection Times/Periods element (2) reject the proposed AP Connection Times/Periods element (3) reject the proposed AP Connection Times/Periods element but propose an alternative AP Connection Times/Periods element.

In the first example, an AP Connection Times/Periods agreement may be established between the peer STAs. In the second example, no AP Connection Times/Periods agreement is established. In the third example, the alternative AP Connection Times/Periods element may be used by the initiator STA to generate a new TDLS Unscheduled AP Connection Request frame. After successfully receiving a TDLS Unscheduled AP Connection Response frame with the Status code indicating acceptance, the proposed AP Connection Times/Periods agreement may be established between the peer STAs.

The AP Connection Times/Periods agreement, once established may be valid until the agreed AP Connection Times/Periods expire or the TDLS direct link is torn down, whichever occurs first. The AP Connection Times/Periods agreement, once established, may not be updated by either of the STAs. The STAs may maintain AP connectivity according to the agreed AP Connection Times/Periods. If the TDLS direct link is on an off-channel then the STAs may switch to the base channel in order to communicate with the AP and then return to the off-channel, all within each AP connection time period allowed by the agreed AP Connection Times/Periods between the STAs.

In a second example embodiment, the TDLS Scheduled AP Connection Request frame and the TDLS Unscheduled AP Connection Request frame may be merged into one frame called a TDLS AP Connection Request frame which contains all the required information for both Scheduled and Unscheduled AP Connection times/periods. A STA may encapsulate the TDLS AP Connection Request frame in a Data frame and transmit it to the peer STA directly or through the AP to setup or change Scheduled and/or Unscheduled AP Connection times/periods while on the TDLS direct link. Correspondingly, the TDLS Scheduled AP Connection Response frame and the TDLS Unscheduled AP Connection Response frame may be merged into one frame called a TDLS AP Connection Response frame that contains all the required information for both Scheduled and Unscheduled AP Connection times/periods. A STA may encapsulate the TDLS AP Connection Response frame in a Data frame and transmit it to the peer STA directly or through the AP, in response to a TDLS AP Connection Request frame.

Figure 12:
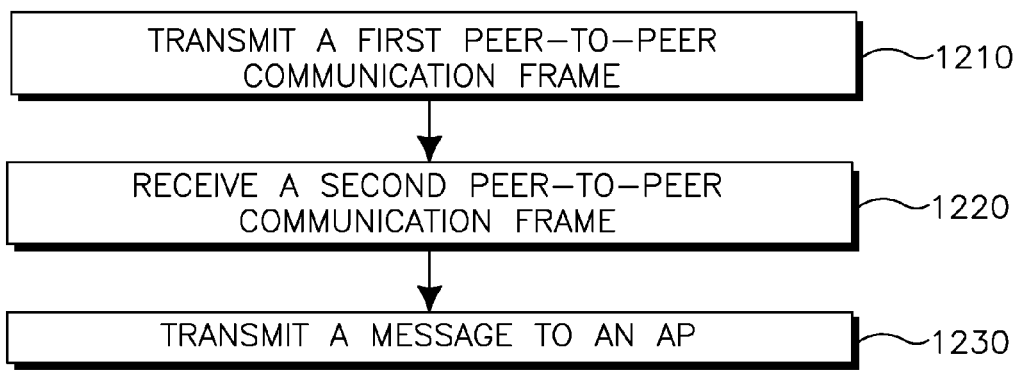
FIG. 12 is an flow diagram of an example method for setting up an AP connection during a peer-to-peer communication.

FIG. 12 is an overview diagram of an example method 1200 for setting up an AP connection during a peer-to-peer communication. Referring to FIG. 12, the STA may transmit a first peer-to-peer communication frame 1210. In response, the STA may receive a second peer-to-peer communication frame 1220 and begin communication with the AP 1230. The initiation and timing of the communication with the AP may be based on information indicated in the first peer-to-peer communication frame 1210, the second peer-to-peer communication frame 1220, or a combination of both.

The following is an example for the transmission of Scheduled/Unscheduled AP Connection times/periods information by STAs in TDLS Request and TDLS Response frames by modifying 802.11z peer-to-peer communication frames as shown in the list in Table 4 below.

TABLE 4

Modifications to Peer-to-peer communication frames for VHT

| Action field value | Peer-to-peer communication frames |
|---|---|
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request (MODIFIED) |
| 8 | TDLS Peer PSM Response (MODIFIED) |
| 9 | TDLS AP PHY Data Rate Request |
| 10 | TDLS AP PHY Data Rate Response |
| Remaining up to 255 | Reserved |

Figure 13:
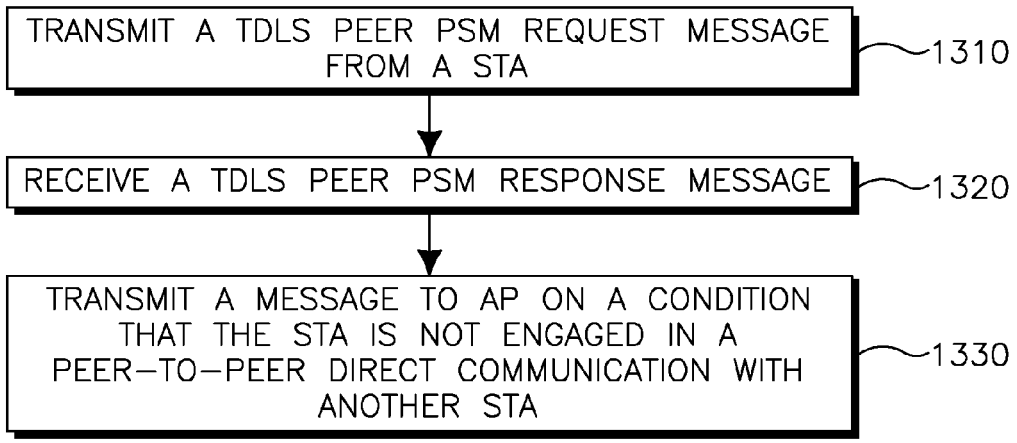
FIG. 13 is a flow diagram of an example method where TDLS Peer Power Save Mode (PSM) Request/Response frames may be used between two STAs to set up or change a PSM based on a periodic schedule.

FIG. 13 is a flow diagram of an example method 1300 where TDLS Peer Power Save Mode (PSM) Request/Response frames may be used between two peer STAs to set up or change a PSM based on a periodic schedule. The periodic schedule for power save mode may be used for AP Connections by the peer STAs where the STAs may maintain AP connectivity in the intervals during which the STAs are not expected to engage in peer-to-peer direct communication as shown in FIG. 13. Referring to FIG. 13, a STA may also explicitly transmit Scheduled/Unscheduled AP Connection Times/Periods information in a TDLS Peer PSM Request frame 1310. In other words, the PSM Schedule may be implicitly used for an AP connection when a peer-to-peer communication is not active, or the AP connection may be explicitly specified in the TDLS Peer PSM Request frame. Status information may be used in TDLS Peer PSM Response frames to indicate success or failure of the TDLS Scheduled/Unscheduled AP Connection Request operation, and if the operation results in failure, the cause of failure. The STA may receive Scheduled/Unscheduled AP Connection Times/Periods information in TDLS Peer PSM Response frame 1320, if the Status information field indicates "AP Connection Times/Periods information rejected but alternative AP Connection Times/Periods information proposed." A Dialog Token field may be used in these TDLS Peer PSM Request and Response frames for matching TDLS Peer PSM Response frames with TDLS Peer PSM Request frames. The STA may then transmit a message to the AP on a condition that the STA is not engaged in a peer-to-peer direct communication with another STA 1330.

The following is an example of a third embodiment for the transmission of Scheduled/Unscheduled AP Connection times/periods information by STAs in TDLS Request and TDLS Response frames. This may be achieved by modifying IEEE 802.11z peer-to-peer communication frames as shown in Table 5 below.

TABLE 5

Modifications to Peer-to-peer communication frames for VHT

| Action field value | Peer-to-peer communication frames |
|---|---|
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request (MODIFIED) |
| 6 | TDLS Channel Switch Response (MODIFIED) |
| 7 | TDLS Peer PSM Request |

TABLE 5-continued

Modifications to Peer-to-peer communication frames for VHT

| Action field value | Peer-to-peer communication frames |
|---|---|
| 8 | TDLS Peer PSM Response |
| 9 | TDLS AP PHY Data Rate Request |
| 10 | TDLS AP PHY Data Rate Response |
| Remaining up to 255 | Reserved |

In IEEE 802.11z, to switch channels, the TDLS Channel Switch Request/Response frames may be used between two STAs. In a modified procedure, a STA may transmit Scheduled/Unscheduled AP Connection Times/Periods information in TDLS Channel Switch Request frame. Status information may be used in TDLS Channel Switch Response frames to indicate success or failure of the TDLS Scheduled/Unscheduled AP Connection Request operation and, if the operation results in failure, the cause of failure. A STA may transmit Scheduled/Unscheduled AP Connection Times/Periods information in TDLS Channel Switch Response frame, if the Status information field indicates "AP Connection Times/Periods information rejected but alternative AP Connection Times/Periods information proposed."

In a fourth example embodiment, a new Enhanced Tunneled Direct Link Setup (ETDLS) may be implemented, where some or all aspects of the IEEE 802.11z TDLS mechanism and one or more of the new enhancements described above are included. Such a new ETDLS mechanism may exist and operate separately from the TDLS of IEEE 802.11z, in a WLAN.

In a fifth example embodiment, if a Tunneled DLS is established between two STAs which are in direct peer-to-peer communication range but associated with different APs, the method and apparatus may be applied with the tunneled path now traversing a first AP, the connection between the two APs and the second AP. The two STAs may then maintain AP connectivity with their respective APs during the agreed AP connection times/periods by establishing this AP connectivity agreement with mechanisms described herein.

In an sixth example embodiment, the STA may take initiative in determining a protocol for a packet exchange during AP Connection times/periods. For example, the determined protocol for the packet exchange may be a MAC protocol for sending and receiving data. The STA may determine the protocol to establish one or more medium reservations with the AP for data exchange during AP Connection times/periods. For example the STA may use, a procedure similar to an IEEE 802.11n packet exchange mechanism called "Reverse Direction Protocol" where a "Reverse Direction" initiator STA, in this case the STA, may transmit packets to and obtain packets from, a "Reverse Direction" responder, in this case the AP. The STA may use any available means to facilitate a Schedule with the AP for data exchange during AP Connection times/periods. The STA may use any of the IEEE 802.11 power management schemes by aligning the AP Connection times/periods to the wake times/periods of the power management schemes. For example, a STA may use the IEEE 802.11 mechanism to setup a Scheduled/Unscheduled Automatic Power Save Delivery (APSD) to receive data. Another mechanism that the STA may use is a power save (PS) mechanism where it sends PS-Poll frames to the AP to receive buffered data.

The STA may have logic implemented in it that determines whether to use: (1) both Scheduled and Unscheduled AP Connection operations (2) only Scheduled AP Connection Operation (3) only Unscheduled AP Connection Operation (4) neither Scheduled nor Unscheduled AP Connection operations. There may also be a user interface implemented in the STA where a user may influence this selection by entering relevant configuration information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for use in a station (STA), the method comprising:
    transmitting a first peer-to-peer communication frame to a second STA to establish a power save mode (PSM), wherein the first peer-to-peer communication frame includes a periodic schedule;
    receiving, from the second STA, in response to the first peer-to-peer communication frame, a second peer-to-peer communication frame, wherein the second peer-to-peer communication frame includes a status code that indicates acceptance of the periodic schedule;
    communicating with the second STA on an off-channel;
    entering the PSM with respect to the second STA based on the periodic schedule; and
    communicating with an access point (AP) on a base channel while in the PSM with respect to the second STA.

2. The method of claim 1 further comprising:
    determining a protocol for a packet exchange during an AP Connection time or period; and
    establishing a medium reservation with the AP for the packet exchange during the AP Connection time or period.

3. The method of claim 1, further comprising:
    switching from the off-channel to the base channel for communicating with the AP.

4. The method of claim 3, further comprising:
    returning to the off channel at the end of communication with the AP.

5. The method of claim 1, wherein the first peer-to-peer communication frame is a tunneled direct link setup (TDLS) Peer Power Save Mode (PSM) Request frame.

6. The method of claim 1, wherein the second peer-to-peer communication frame is a tunneled direct link setup (TDLS) Peer Power Save Mode (PSM) Response frame.

7. The method of claim 1, wherein the first peer-to-peer communication frame contains an information element (IE) that indicates a Scheduled or Unscheduled access point (AP) connection time or period.

8. The method of claim 1, wherein the second peer-to-peer communication frame contains an information element (IE) that indicates an alternate Scheduled or Unscheduled access point (AP) connection time or period.

9. The method of claim 1, wherein the first peer-to-peer communication frame is transmitted transparently through an AP or directly to the other STA.

10. The method of claim 1, wherein the first peer-to-peer communication frame is encapsulated in a data frame.

11. The method of claim 1, wherein the second peer-to-peer communication frame is received encapsulated in a data frame.

12. The method of claim 1, wherein communicating with the AP includes accessing a network via the AP.

13. A station (STA) comprising:
    a transmitter configured to transmit a first peer-to-peer communication frame to a second STA to establish a power save mode (PSM), wherein the first peer-to-peer frame includes a periodic schedule;
    a receiver configured to receive, from the second STA, in response to the first peer-to-peer communication frame, a second peer-to-peer communication frame, wherein the second peer-to-peer frame includes a status code that indicates acceptance of the periodic schedule; and
    a processor configured to cause the STA to operate in the PSM with respect to the second STA based on the periodic schedule,
    wherein the transmitter and the receiver are further configured to:
        communicate with the second STA on an off-channel while the STA is not in the PSM with respect to the second STA; and
        communicate with an access point (AP) on a base channel while the STA is in the PSM with respect to the second STA.

14. The STA of claim 13, wherein the processor is configured to determine a protocol for a packet exchange during an AP Connection time or period and establish a medium reservation with the AP for the packet exchange during the AP Connection time or period.

15. The STA of claim 13, wherein the processor is further configured to switch from the off-channel to the base channel for communicating with the AP.

16. The STA of claim 15, wherein the processor is further configured to return to the off channel at the end of communication with the AP.

17. The STA of claim 13, wherein the transmitter is configured to transmit a first peer-to-peer communication frame that contains an information element (IE) that indicates a Scheduled or Unscheduled access point (AP) connection time or period.

18. The STA of claim 13, wherein the receiver is configured to receive a second peer-to-peer communication frame that contains an information element (IE) that indicates an alternate Scheduled or Unscheduled access point (AP) connection time or period.

19. The STA of claim 13, wherein the transmitter is configured to transmit a first peer-to-peer communication frame transparently through an AP or directly to the other STA.

20. The STA of claim 13, wherein the transmitter is further configured to transmit the first peer-to-peer communication frame encapsulated in a data frame.

21. The STA of claim 13, wherein the receiver is further configured to receive the second peer-to-peer communication frame encapsulated in a data frame.

22. The STA of claim 13, wherein the transmitter and the receiver are further configured to communicate with the AP to access a network.

23. A method for use in a station (STA), the method comprising:
- transmitting a first peer-to-peer communication frame to a second STA to establish a power save mode (PSM), wherein the first peer-to-peer communication frame includes a periodic schedule;
- receiving, from the second STA, in response to the first peer-to-peer communication frame, a second peer-to-peer communication frame, wherein the second peer-to-peer communication frame includes a status code that indicates acceptance of the periodic schedule;
- communicating with the second STA on an off-channel;
- entering the PSM with respect to the second STA based on the periodic schedule; and
- transmitting a message to an access point (AP) on a base channel while in the PSM with respect to the second STA.

* * * * *